Dec. 16, 1924.

J. H. CONNOLLY 1,519,956

ATTACHMENT FOR INTERNAL COMBUSTION ENGINES

Filed Feb. 12, 1921     2 Sheets-Sheet 1

J. H. Connolly
INVENTOR

BY Victor J. Evans
ATTORNEY

WITNESS:

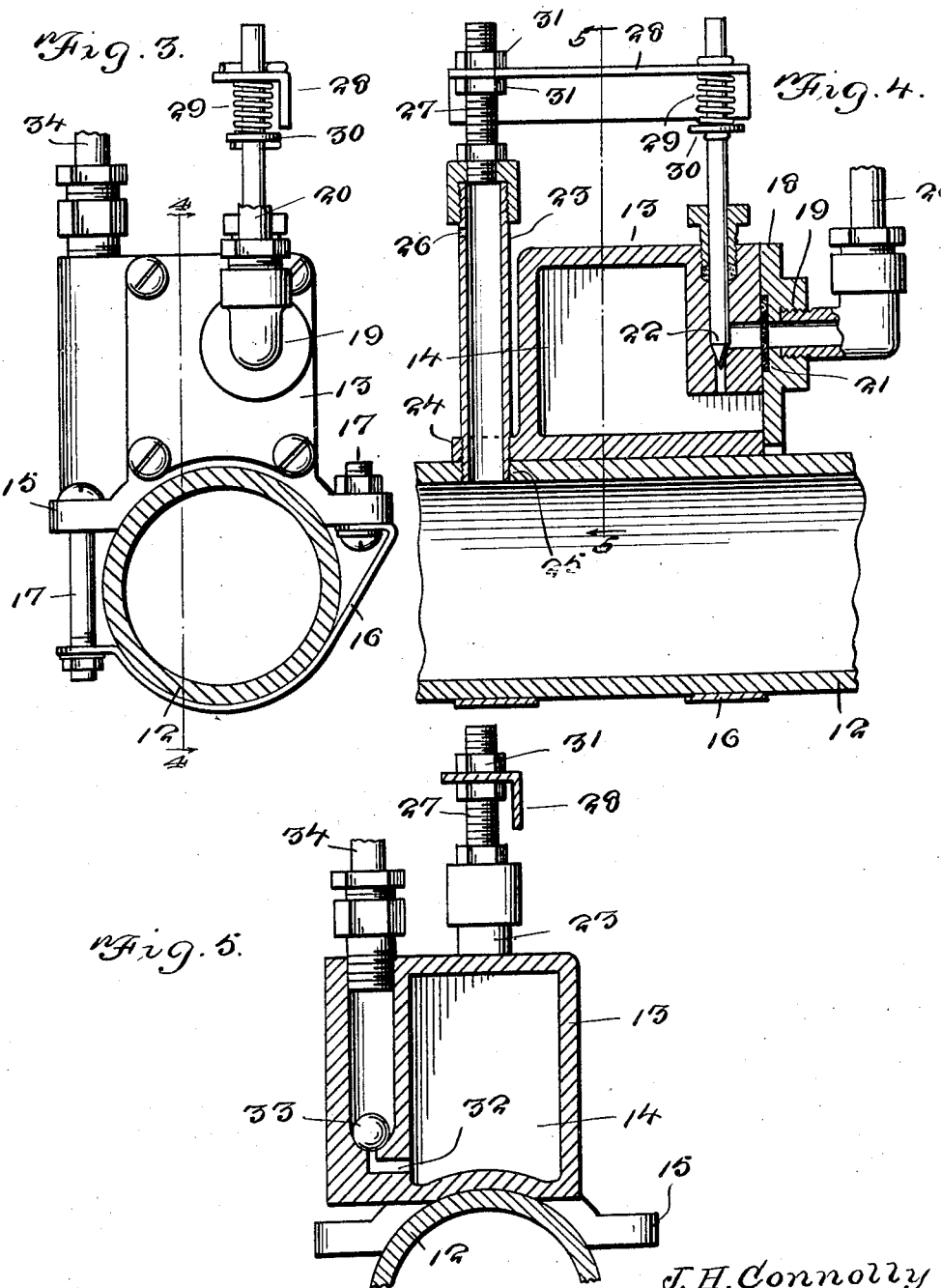

Patented Dec. 16, 1924.

1,519,956

UNITED STATES PATENT OFFICE.

JAMES HAYWOOD CONNOLLY, OF EL PASO, TEXAS.

ATTACHMENT FOR INTERNAL-COMBUSTION ENGINES.

Application filed February 12, 1921. Serial No. 444,515.

*To all whom it may concern:*

Be it known that I, JAMES H. CONNOLLY, a citizen of the United States, residing at El Paso, in the county of El Paso and State of Texas, have invented new and useful Improvements in Attachments for Internal-Combustion Engines, of which the following is a specification.

This invention relates to attachments for internal combustion engines and has for an object the provision of means whereby steam may be supplied to the engine cylinders for the purpose of promoting combustion and eliminating carbon.

Another object of the invention is the provision of a device for the above purposes, which is automatically operated, its operation being controlled by the heat from the engine exhaust, so that the supply of steam will be cut off when the engine is not running, but will be maintained during the operation of said engine.

A further object is the provision of a device as above set forth, which is simple in construction and operation and which may be easily attached to an engine of any type.

Other objects and advantages of the invention will appear as the following description is read in connection with the accompanying drawings.

In the drawings:—

Figure 3 is an end elevation of the device.

Figure 4 is a section along the line 4—4 of Figure 3, and

Figure 5 is a section along line 5—5 of Figure 4.

Figure 1:
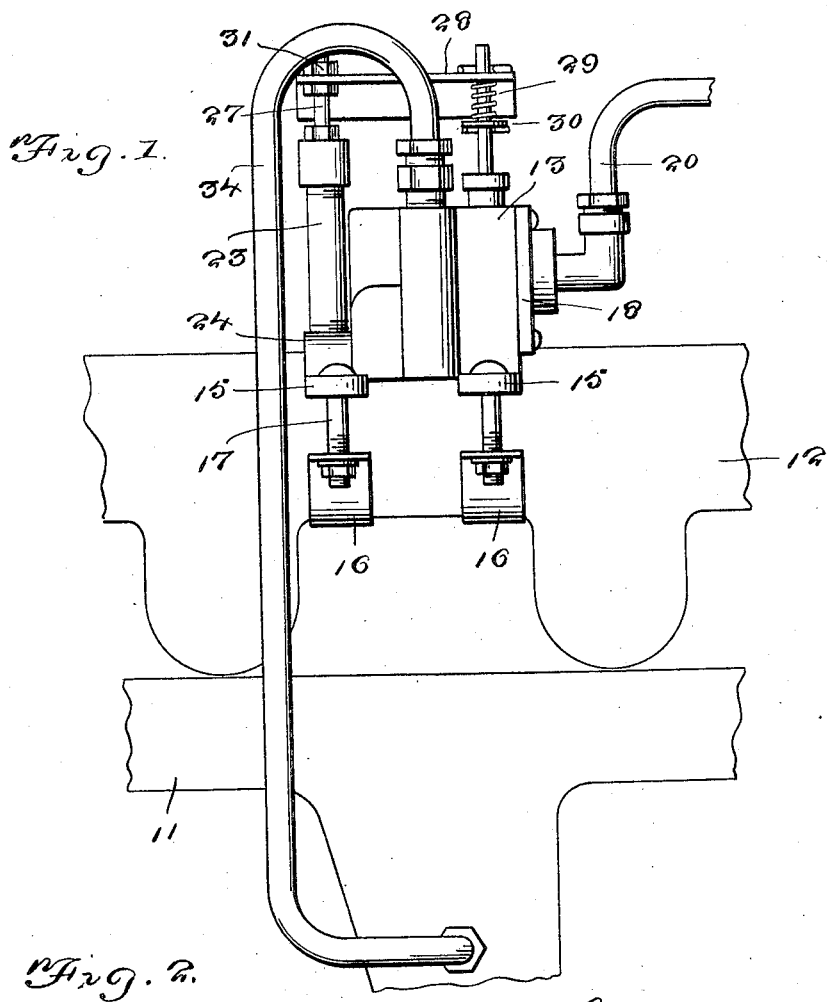
Figure 1 is an elevation showing the application of the invention.
Figure 2:
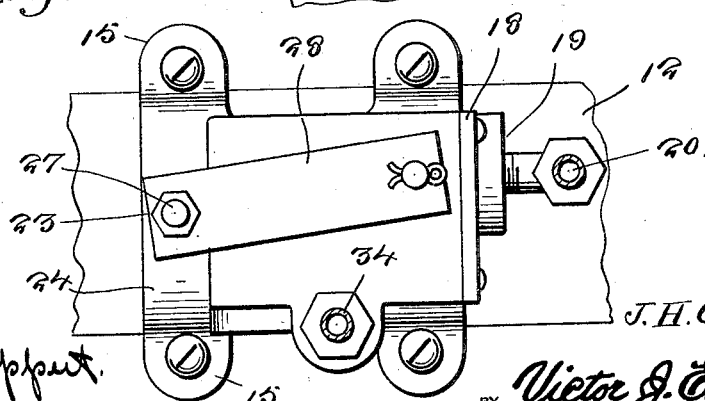
Figure 2 is a plan view of the same.

Referring specifically to the drawings, wherein like characters of reference denote corresponding parts, the reference character 11 indicates the usual intake manifold thru which fuel is supplied to the cylinders of an internal combustion engine from a carburetor (not shown), the burnt gases being exhausted through the usual exhaust pipe 12.

The invention resides in the provision of means for supplying steam to the engine cylinders for the purpose of forming hydrogen and carbon monoxide gas, both of which are combustible when mixed with oxygen, so that combustion within the engine cylinders is aided and the accumulation of carbon deposits prevented.

To accomplish this there is provided a casing 13 of suitable size and shape, which is designed to be secured to the exhaust pipe 12 so that the interior of this casing which provides a steam chamber 14 will be heated from the exhaust of the engine. The casing 13 is provided with ears 15, which are designed to be secured to the opposite ends of straps 16 which pass around the exhaust pipe 12, the securing means being effected through the medium of screws 17.

One end of the casing is closed by a head 18, which is provided with an opening 19, forming an inlet opening for the steam chamber 14, water being supplied to this chamber from a suitable source, such as the water circulating system of the engine, through the medium of a pipe 20. The inlet opening 19 is preferably covered by a screen 21, so that water passing into the steam chamber will be strained and the entrance of any extraneous matter prevented.

The supply of water to the steam chamber 14 is controlled by a needle valve 22, the latter being automatically operated, the operation being so controlled that the supply of water will be cut off when the engine is idle, but will be permitted when the engine is running. For the purpose of operating this valve there is provided a thermostat in the form of a short pipe section or tube 23. One end of this pipe or tube is in threaded engagement with an opening provided in a flange 24 extending from one end of the casing 13, while the lower open end of this pipe is in communication with the interior of the exhaust pipe 12 through the medium of an opening 25 formed in said pipe. The upper end of the pipe or tube 23 has a restricted outlet opening 26, so that the heat and exhaust gases may circulate therethrough and a constant supply of heat be provided during the operation of the engine. Tube 23 is formed of any suitable thermostatic metal so as to expand and contract as it is alternately heated and cooled. Extending from the upper end of the pipe or tube 23 is a rod 27 and connected to this rod is one end of an arm 28, whose opposite end is connected to the needle valve 22. A spring 29 surrounds this valve and is located between the arm and a washer or flange 30 secured to the needle valve so that the latter will be effectually seated. The position of the arm 28 upon the rod 27 may be adjusted through the medium of adjusting nuts 31.

The casing 13 is also provided with an outlet port 32, which is controlled by a ball valve 33, this port being in communication preferably with the intake manifold through the medium of a pipe 34 which is connected in the manifold preferably at a point between the carbureter and the engine cylinders. If desired however, the steam chamber may be connected to the carbureter.

It is believed that from the foregoing description and the accompanying drawings, that the construction, operation and advantages of the invention will be apparent and that further description will be unnecessary.

The invention is susceptible of various changes in its form, proportions and minor details of construction and the right is herein reserved to make such changes as properly fall within the scope of the appended claim.

Having described the invention what is claimed is:—

A humidifying device for internal combustion engines comprising a steam generating chamber fixed to the exhaust pipe of the engine and provided with inlet and outlet openings, a needle valve rising from the casing and controlling the inlet opening, a vertically disposed thermostatic metal tube in communication with the exhaust pipe and provided with an outlet opening adjacent its outer end, a threaded rod adjustably associated with the upper end of the tube and an arm bridging the threaded rod and needle valve respectively for the purpose specified.

In testimony whereof I affix my signature.

JAMES HAYWOOD CONNOLLY.